United States Patent
Beatty et al.

(10) Patent No.: US 8,386,438 B2
(45) Date of Patent: Feb. 26, 2013

(54) METHOD FOR RESTORING DATA FROM A MONOLITHIC BACKUP

(75) Inventors: Louis Beatty, Ormond, FL (US); Steven R. DeVos, Kirkland, WA (US); Deepak Saraf, Windermere, FL (US)

(73) Assignee: Symantec Corporation, Mountain View, CA (US)

( * ) Notice: Subject to any disclaimer, the term of this patent is extended or adjusted under 35 U.S.C. 154(b) by 312 days.

(21) Appl. No.: 12/407,630

(22) Filed: Mar. 19, 2009

(65) Prior Publication Data

US 2010/0241618 A1 Sep. 23, 2010

(51) Int. Cl.
G06F 7/00 (2006.01)

(52) U.S. Cl. .................. 707/667; 707/679; 707/803

(58) Field of Classification Search .................. 707/679, 707/667, 803
See application file for complete search history.

(56) References Cited

U.S. PATENT DOCUMENTS

| | | | |
|---|---|---|---|
| 5,276,860 A | 1/1994 | Fortier et al. | |
| 5,535,381 A | 7/1996 | Kopper | |
| 5,555,371 A | 9/1996 | Duyanovich et al. | |
| 5,559,991 A | 9/1996 | Kanfi | |
| 5,835,953 A | 11/1998 | Ohran | |
| 5,991,542 A | 11/1999 | Han et al. | |
| 6,029,168 A | 2/2000 | Frey | |
| 6,085,298 A | 7/2000 | Ohran | |
| 6,101,585 A | 8/2000 | Brown et al. | |
| 6,360,330 B1 | 3/2002 | Mutalik et al. | |
| 6,366,987 B1 * | 4/2002 | Tzelnic et al. | 711/162 |
| 6,542,962 B2 | 4/2003 | Kodama et al. | |
| 6,640,278 B1 | 10/2003 | Nolan et al. | |
| 6,665,815 B1 | 12/2003 | Goldstein et al. | |
| 6,714,952 B2 * | 3/2004 | Dunham et al. | 707/645 |
| 6,829,688 B2 | 12/2004 | Grubbs et al. | |
| 6,847,983 B2 | 1/2005 | Somalwar et al. | |
| 6,865,655 B1 * | 3/2005 | Andersen | 711/162 |
| 6,880,051 B2 * | 4/2005 | Timpanaro-Perrotta | 711/162 |
| 6,910,112 B2 * | 6/2005 | Berkowitz et al. | 711/162 |
| 6,938,135 B1 | 8/2005 | Kekre et al. | |
| 6,976,039 B2 * | 12/2005 | Chefalas et al. | 1/1 |
| 7,149,858 B1 | 12/2006 | Kiselev | |

(Continued)

FOREIGN PATENT DOCUMENTS

EP 838758 4/1998

OTHER PUBLICATIONS

European Search Report Application No. 10157097.6-2224 mailed Jul. 21, 2010.

(Continued)

*Primary Examiner* — John E Breene
*Assistant Examiner* — Joshua Bullock
(74) *Attorney, Agent, or Firm* — Rory D. Rankin; Meyertons, Hood, Kivlin, Kowert & Goetzel, P.C.

(57) ABSTRACT

A computer system and methods for restoring data from a copy of a database file. The method includes receiving a request to restore an item from the copy of the database file. The item includes a file and associated context information describing the file in a first intranet portal application environment. The method further includes retrieving a schema including the item from the copy of the database file and generating an item file comprising a copy of the file. The item file is independent of the context information. The method further includes generating a metadata file based on the context information, associating the metadata file with the item file, storing the item file and associated metadata file in a file system, and restoring the item to a second intranet portal application or to a third application via the file system.

20 Claims, 6 Drawing Sheets

U.S. PATENT DOCUMENTS

| | | | |
|---|---|---|---|
| 7,290,017 B1 | 10/2007 | Wang et al. | |
| 7,290,101 B1 | 10/2007 | Kekre et al. | |
| 7,389,314 B2 | 6/2008 | Kulkarni et al. | |
| 7,549,032 B1 | 6/2009 | Kekre et al. | |
| 7,596,713 B2 | 9/2009 | Mani-Meitav et al. | |
| 7,617,414 B2 | 11/2009 | Becker et al. | |
| 7,672,934 B1 * | 3/2010 | Beatty et al. | 707/999.003 |
| 2003/0163495 A1 | 8/2003 | Lanzatella et al. | |
| 2003/0177149 A1 | 9/2003 | Coombs | |
| 2004/0243928 A1 * | 12/2004 | Hesmer et al. | 715/505 |
| 2004/0267839 A1 * | 12/2004 | Mendonca et al. | 707/204 |
| 2004/0268068 A1 | 12/2004 | Curran | |
| 2005/0050071 A1 * | 3/2005 | Debrunner | 707/100 |
| 2005/0138087 A1 | 6/2005 | Beck et al. | |
| 2005/0149584 A1 * | 7/2005 | Bourbonnais et al. | 707/204 |
| 2006/0041556 A1 * | 2/2006 | Taniguchi et al. | 707/10 |
| 2006/0184561 A1 * | 8/2006 | Terada | 707/102 |
| 2006/0230116 A1 | 10/2006 | Couper et al. | |
| 2007/0266064 A1 * | 11/2007 | Debrunner | 707/204 |
| 2008/0307000 A1 | 12/2008 | Paterson et al. | |
| 2009/0210427 A1 * | 8/2009 | Eidler et al. | 707/10 |

OTHER PUBLICATIONS

"Windows DDK Glossary," http://msdn.microsoft.com/library/default.asp?url=/library/en-us/gloss/hh/gloss/glossary_628b1dfc-c8f0-4143-a4ef-0dddae24be4b.xml.asp, (3 pages).

"Repliweb R-1 User Guide—Version 3.1," RepliWeb, Inc., 2002, (27 pages).

"FilesX Xchange RestoreTM for Microsoft Exchange Server," FilesX, Inc., Aug. 2003, (2 pages).

"Instructor Articles," VERITAS Education, pp. 1-7, Apr. 2003.

"EMC TimeFinder Family," EMC Corporation, 8 pages, Oct. 2004.

"EMC TimeFinder Local Replication," EMC Corporation, 2 pages, Oct. 2004.

"Storage Area Networking-High-Speed Data Sharing Among Multiple Computer Platforms", Tivoli Systems, Inc., Copyright 2000. ftp://ftp.software.ibm.com/software/tivoli/whitepapers/san_datasharing_wp.pdf, (2000), 4 pages.

"Storage Management—Best Practices", Copyright 2001, IBM Corp., ftp://ftp.software.ibm.com/software/tivoli/whitepapers/wp-storage-bp.pdf, (2001), 11 pages.

Amiri, Khalil S., "Scalable and manageable storage systems", Ph.D. Thesis, Dept. of Electrical and Computer Engineering, Carnegie Mellon University, Pittsburgh, PA, http://www.pdl.cmu.edu/PDL-FTP/NASD/amiri_thesis.pdf, (Dec. 2000), i-241 pgs.

Wylie, Jay J., et al., "Selecting the Right Data Distribution Scheme for a Survivable Storage System", Research Paper, School of Computer Science, Carnegie Mellon University, Pittsburgh, PA, http://www.pdl.cmu.edu/PDL-FTP/Storage/CMU-CS-01-120.pdf, May 2001), pp. 1-21.

* cited by examiner

METHOD FOR RESTORING DATA FROM A MONOLITHIC BACKUP

BACKGROUND OF THE INVENTION

1. Field of the Invention

This invention relates to the field of computer processing and, more particularly, to restoring electronic documents.

2. Description of the Related Art

As computer memory storage and data bandwidth increase, so does the amount and complexity of data that business and industry manage each day. A large portion of the data that must be managed in an enterprise involves content managed for a company or workgroup by a dedicated server, such as an enterprise information portal, which provides employees and customers the ability to search and access corporate information, including electronic documents, announcements, task, discussion topic, etc., that may be organized as lists of items. The enterprise information portal can serve as the single gateway to log into the corporate network and retrieve electronic documents. It is noted that enterprise information portals are typically secure and private (also known as intranet portals), but also may include external gateways for wider or even public access.

An enterprise information portal often includes a back-end database system, which may server as a document management system. The back-end database system can store data in the form of electronic documents, metadata and other content associated with the portal, such as web pages. The back-end database in an enterprise information portal can be a variant of a stand-alone database system, which has been configured for document and content management.

Because electronic documents frequently contain crucial information, the contents of electronic document servers (e.g., an enterprise information portal along with its back-end database) may be archived, or backed up, to an archival storage to prevent loss or corruption of data. In particular, a back-end database is often backed up as a single, monolithic database file, which contains all the tables, records, and indexing information for the database.

When a user wants to restore one or more items or lists to the portal, the single database file may be reinstalled as a target of the portal. Unfortunately, reinstallation of a large, monolithic database may be time-consuming and inefficient when restoration of only a small number of items or lists is desired. There may also be occasions when a user desires the portal to be able to access an item in a raw file format rather than as a portal item or list. In addition, there may be occasions when a user desires to have an application other than the portal access an electronic document, announcement, task, discussion topic, etc.

Thus it would be desirable to restore individual data objects from an archived database file without having to reinstall the database system and in a format that is accessible to either an enterprise information portal or another application.

SUMMARY OF THE INVENTION

Various embodiments of a computer system and methods for restoring data from an archived copy of a database file are disclosed. In one embodiment, the method includes receiving a request to restore an item from the archived copy of the database file. The item comprises a file and associated context information describing the file in an environment that is specific to a first intranet portal application. The method further includes retrieving a schema including the item from the archived copy of the database file and generating an item file comprising a copy of the file. The item file is independent of the context information. The method further includes generating a metadata file based on the context information, associating the metadata file with the item file, and storing the item file and the associated metadata file in a file system. The method further includes restoring the item to a second intranet portal application via the file system.

In a further embodiment, the first and second intranet portal applications are the same application. In another embodiment, the method further includes redirecting the file to a third application directly through the file system without accessing the context information. In this and other embodiments, the third application is different from the first and the second applications.

In a still further embodiment, the context information comprises one or more file attributes. For each file attribute, the metadata file includes a corresponding tagged element. In some embodiments, the element tags conform to the Collaborative Application Markup Language (CAML). In yet another embodiment, the item comprises an electronic document.

In yet another embodiment, the method further includes receiving a request to restore a list comprising two or more items from the archived copy of the database file. The list includes files all having the same file type. Each file is associated with context information describing the file in an environment that is specific to the first intranet portal application. The method further includes retrieving a list schema that includes the items from the archived copy of the database file. For each item in the list, the method further includes generating an item file comprising a copy of the file. The item file is independent of the context information. For each item in the list, the method further includes generating a metadata file based on the context information, associating the metadata file with the item file, and storing the item file and the associated metadata file in a file system. The method further includes restoring the list to a second intranet portal application via the file system.

Figure 1:
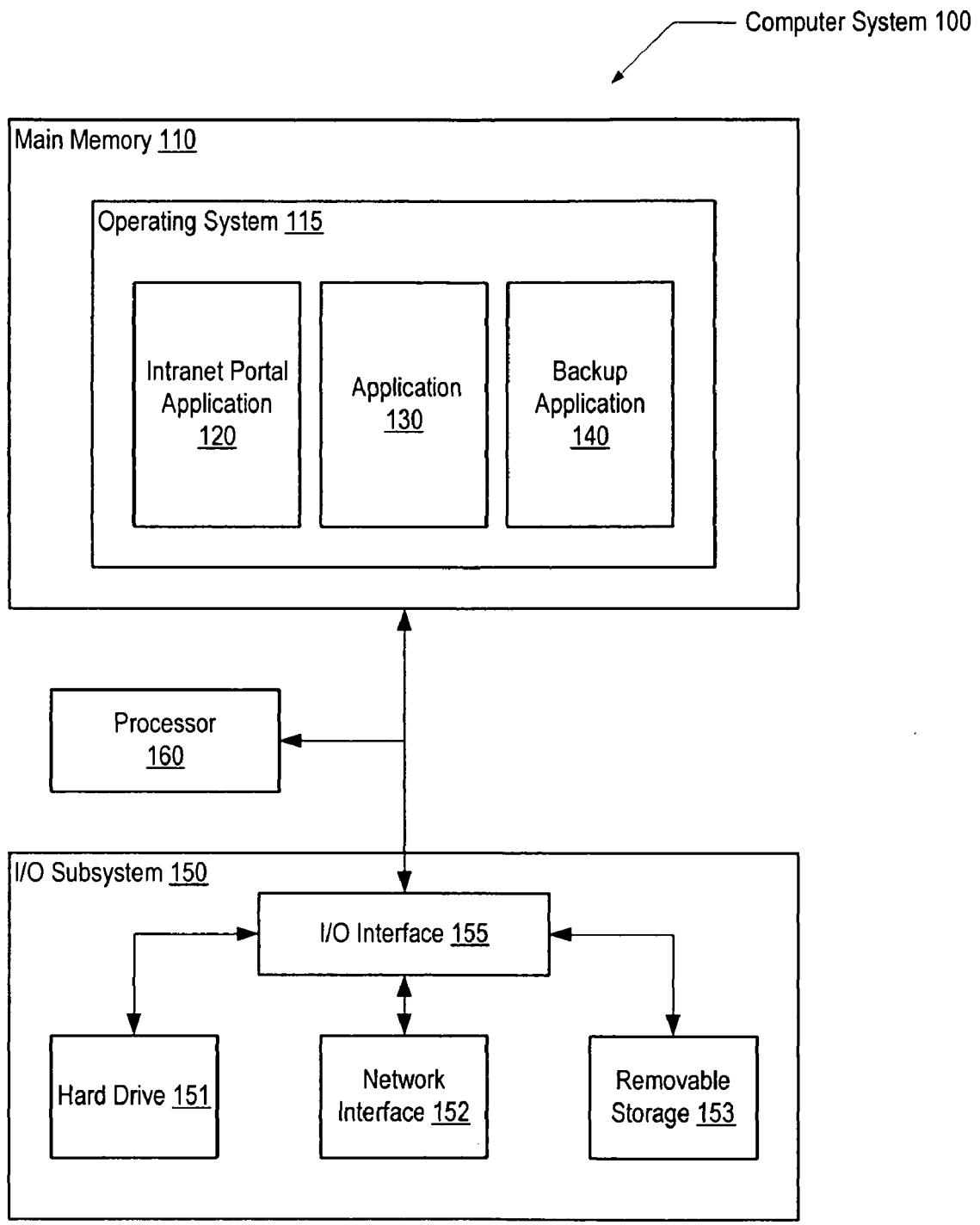
FIG. 1 is a generalized block diagram of one embodiment of a computer system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

FIG. 1 is a generalized block diagram of one embodiment of a computer system 100. Computer system 100 includes a processor 160 coupled to a main memory 110. Processor 160 and main memory 110 are in turn connected to an I/O subsystem 150, which comprises an I/O interface 155, a hard disk drive 151, a network interface 152, and a removable storage 153. Computer system 100 may be representative of a laptop, desktop, server, workstation, terminal, personal digital assistant (PDA) or any other type of computer system.

Processor 160 is representative of any of various types of processors such as an x86 processor, a PowerPC processor or a SPARC processor. Similarly, main memory 110 is representative of any of various types of memory, including DRAM, SRAM, EDO RAM, Rambus RAM, etc.

I/O interface 150 is operational to transfer data between processor 160 and/or main memory 110 and one or more internal or external components such as hard disk drive 151, network interface 152 and removable storage 153, as desired. For example, I/O interface 155 may embody a PCI bridge operable to transfer data from processor 160 and/or main memory 110 to one or more PCI devices. I/O interface 155 may additionally or alternatively provide an interface to devices of other types, such as SCSI devices and/or Fibre channel devices.

Hard disk drive 151 may be a non-volatile memory such as a magnetic media. Network interface 155 may be any type of network adapter, such as Ethernet, fiber optic, or coaxial adapters. Removable storage 153 is representative of a disk drive, optical media drive, tape drive, or other type of storage media, as desired.

In addition to the depicted hardware components, computer system 100 may additionally include various software components. For example, FIG. 1 illustrates an operating system 115 stored in main memory 110. Operating system 115 is representative of any of a variety of specific operating systems, such as, for example, Microsoft Windows, Linux, or Sun Solaris. As such, operating system 115 may be operable to provide various services to the end user and provide a software framework operable to support the execution of various programs such as an Intranet Portal application 120, a backup application 140 or any of a variety of other applications represented in the illustrated embodiment by application 130. It is noted that the depicted software components of FIG. 1 may be paged in and out of main memory 110 in a conventional manner from a storage medium such as hard drive 151.

In various embodiments, intranet portal 120 is operable to manage and maintain a plurality of electronic documents for a plurality of system users. In one particular implementation, intranet portal 120 is embodied by a Microsoft SharePoint Server or a similar enterprise information portal program.

Figure 2:
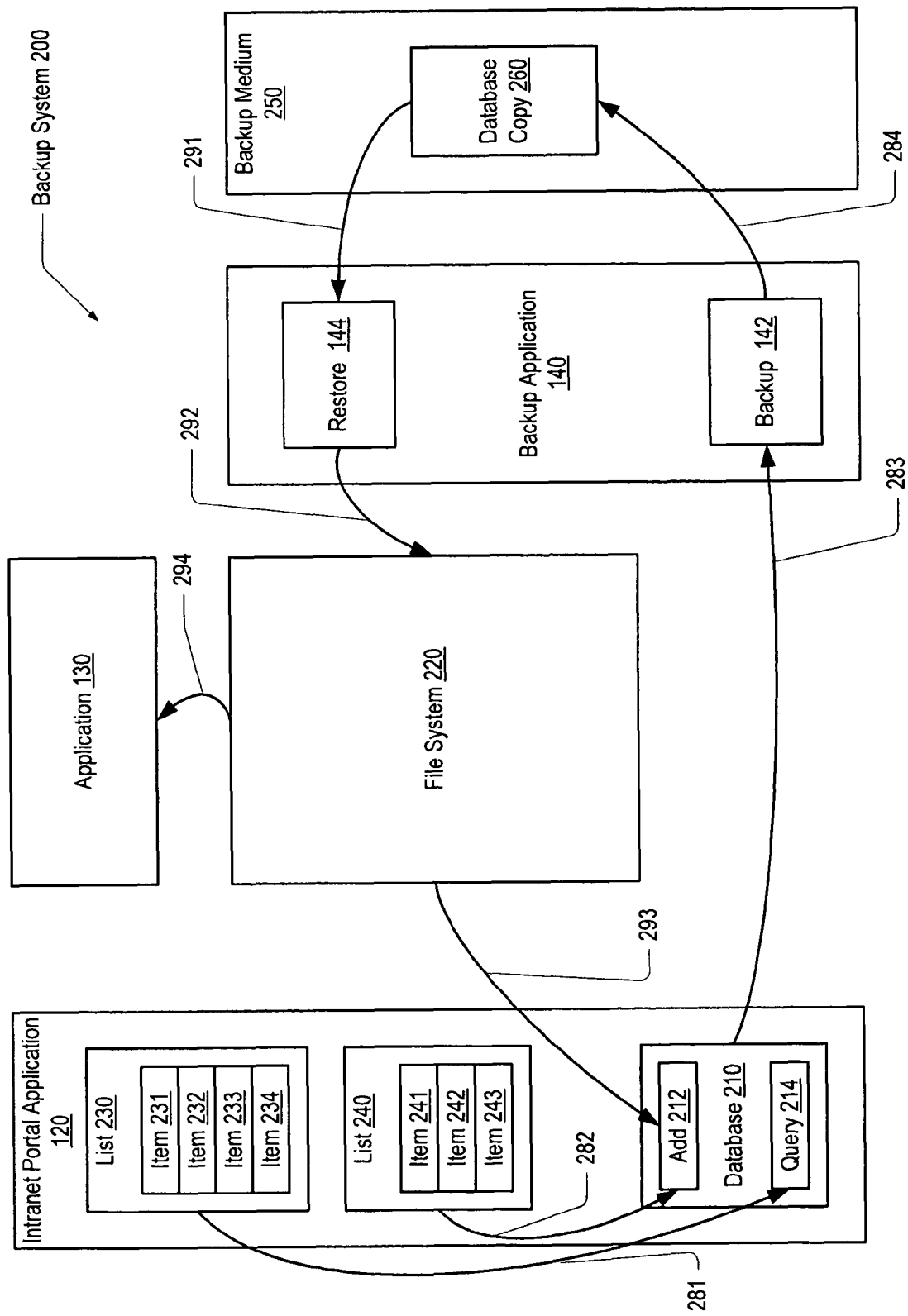
FIG. 2 is a block diagram of one embodiment of a backup system.

Turning now to FIG. 2, a block diagram of one embodiment of a backup system 200 is illustrated. Backup system 200 includes intranet portal 120, application 130, and backup application 140 that may be included in computer system 100 of FIG. 1. Backup system 200 also includes a file system 220 that may be stored within hard drive 151, removable storage 153, or otherwise employed by computer system 100 for data storage. As referred to herein, a "file system" shall mean an information system which references and stores data, hierarchically organized in files and directories, in a volume created on a storage medium. The file system provides access to the data on the storage medium. Backup system 200 may further include a backup medium 250 coupled to backup application 140 that may be used by backup application 140 to store backup datasets.

In one embodiment, intranet portal 120 may manage and organize electronic content as items within lists. As referred to herein, an "item" shall mean a document, announcement, task, discussion topic, or other electronic content that is managed by an intranet portal and a "list" shall mean a logical group of items. In the illustrated embodiment, intranet portal 120 includes lists 230 and 240. List 230 includes items 231-234 and list 240 includes items 241-243. In the illustrated embodiment, intranet portal 120 may also include an encapsulated version of a database 210 for storing lists and items. In one embodiment, intranet portal 120 may be configured to be the 'user' of database 210. In one specific implementation, database 210 is embodied by Microsoft SQL Server or a similar database server system. It is further noted that one or more client computers (not shown in FIG. 1) may be coupled via network to computer system 100. The client systems may access the intranet portal 120 centrally via one or more web pages, including access to database 210.

Database 210 represents both a database program and one or more actual databases implemented therein (not shown in FIG. 2). The database program refers to the executable commands, user interfaces and other program code for operating database 210. The databases included in database 210 may further include various tables, indexes, relationships, queries, stored procedures, file systems, security layers, networking interfaces, etc., which are configured to operate on a plurality of data records, also referred to as records or entries, that constitute the "database." In one embodiment in which database 210 is a relational database, the records are arranged in tables (row and column arrangement). The term "record" as used herein shall refer to an entry in a database. A collection of associated records may be collectively described as a "table" in the database. A record may consist of one or more fields, which may serve as indexes (or keys) to other records in other tables. For example, in a document management database, each record in a document table may represent a document (or data object) stored in the database. In one embodiment, the document (data object) may be stored in the fields of the record itself. In some embodiments, the document (data object) is represented in a record by a reference to the document, such as a memory location. In addition, database 210 may create and modify a mounted database file (not shown in FIG. 2) for storing and accessing any given implementation of a relational database. In some embodiments, database 210 executes on a dedicated computing system that is configured for access by other server and client computers via a communications network.

In particular, database 210 is shown in FIG. 2 to include two functions, query 214 and add 212. These functions are shown as an example of functionality included within a relational database. In various embodiments, other kinds of functions, store procedures, or programs may be executed in a relational database. The query function 214 represents a function used to retrieve information from database 210, whereas the add function 212 represents a function to store information in database 210. It is noted that the query 214 and 212 functions may operate on data related to the relational database program or on data from any of the databases implemented therewith in a given instance of database 210. The query function 214 may be accessed via interface 281, while the add function is shown with access via interface 282. For example, as shown intranet portal 120 may query database 214 via interface 281 to retrieve one or more of items 231-234 in list 230. Further, intranet portal 120 may access add function 212 via interface 282 to store in database 214 one or more of items 241-244 of list 240. The interfaces 281 and 282 may include a local or remote network interface, and may also include network and/or software driver layers for communicating with database 210. In one embodiment, interfaces 281 and 282 provide access to database 210 using SQL (Structured Query Language).

Backup system 200 is operable to perform a backup of content managed by intranet portal 120 and stored in database 210. In particular, backup application 140 may include a backup function 142 that may communicate with database 210 via interface 283 for selecting and retrieving content for archiving. Backup function 142 may generate a schema of table and index information along with the backed up contents of a database and store the generated schema to a database copy 260 on backup medium 250 via interface 284. As used herein, "schema" refers to the data structure of a database file. It is noted that the database copy 260 may be an identical instance of a database file (not shown in FIG. 2) previously created by database 210. In one embodiment, database copy 260 is a binary file that is sequentially accessed, using standard file I/O calls to the file system of the storage medium on which the binary file is stored. It is further noted that database copy 260 may be structured in block units of memory, also referred to as pages or allocation units. The schema may then be used to access or restore the contents of database copy 260, without using database 210. Backup medium 250 represents any of a variety of storage media including removable media, network attached storage, etc. (or any other type of archive storage). In various embodiments, interfaces 283 and 284 may include a network connection along with the necessary network and software drivers, as previously mentioned.

Additionally, backup application 140 may include a restore function 144 that can read specific documents from database copy 260 via interface 291 and add them to file system 220 via interface 292. Various embodiments of methods for restoring documents from a database file are described in a U.S. patent application Ser. No. 11/551,018, entitled "METHOD FOR RESTORING DOCUMENTS FROM A DATABASE FILE," the entirety of which is incorporated herein by reference. The restore function may also include a means for selecting one or more documents for restoration. In one embodiment, a user interface for selecting and restoring documents is provided with the restore function 144 as described further below. In various embodiments, backup system 200 is further operable to direct specific documents that have been restored to file system 220 either to database 210 via interface 293 or to application 130 via interface 294 according to a process that is described further below. Backup application 140 may also be configured to provide other known archiving functionality, as desired, such as various features provided by the Enterprise Vault™ or Backup Exec™ products from Veritas.

Figure 3:
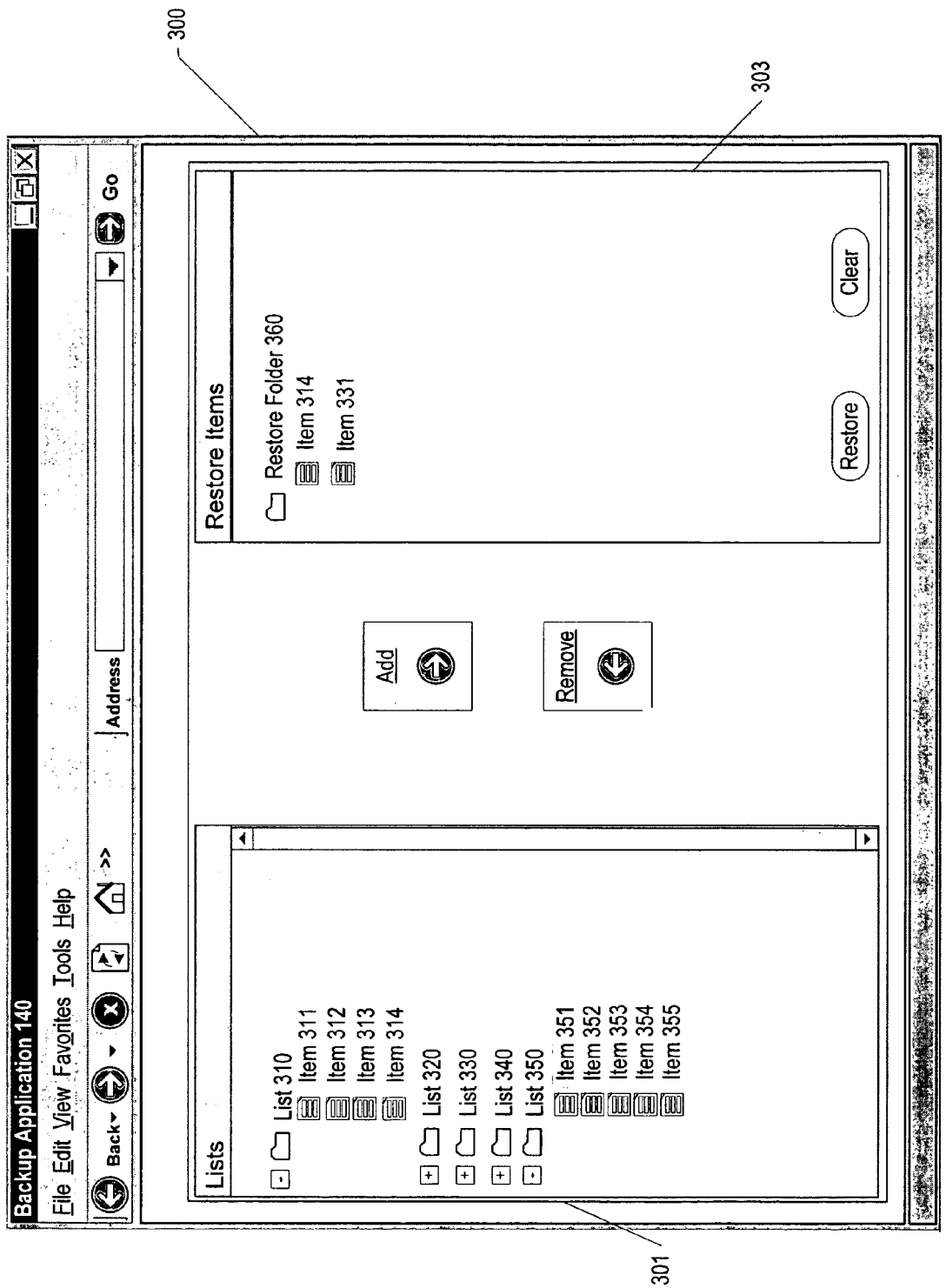
FIG. 3 illustrates one embodiment of user interface that may be presented by a backup application for selecting specific lists or items to be restored.

Turning now to FIG. 3, one embodiment of user interface 300 that may be presented by backup application 140 for selecting specific lists or items to be restored is illustrated. Interface 300 may include features such as drop-down menus, a navigation bar, an address field, and so on. Within interface 300 are shown a "Lists" pane 301 and a "Restore Items" pane 303. Within Lists pane 301, a hierarchy of lists and items may be seen and navigated. The illustrated hierarchy includes lists 310, 320, 330, 340, and 350. List 310 includes items 311-314. List 350 includes items 351-355. Lists and items may be selected as indicated by a highlighted background and added to Restore Items pane 303 via an Add button. Restore Items pane 303 includes a restore folder 360 that includes items 314 and 351 to be restored. Lists and items may be selected and removed from Restore Items pane 303 via a Remove button. Restore Items pane 303 also includes a Restore button and a Clear button. Once a set of restore items has been selected, restoration may proceed. If the Restore button is selected, the items listed in Restore Items pane 303 may be added to a file system where they may be accessed by various applications. If the Clear button is selected, the items listed in the Restore Items pane are removed from the pane.

It is noted that the naming conventions depicted in FIG. 3 (e.g., "List 310", "Item 311", etc.) are provided for ease of discussion. In a typical embodiment, names reflective of those used in ordinary business or other environments (e.g., Documents, Spreadsheets, Tasks, Discussion Topics, as well as user-defined list and/or items names, etc.) may be used, as desired.

Figure 4:
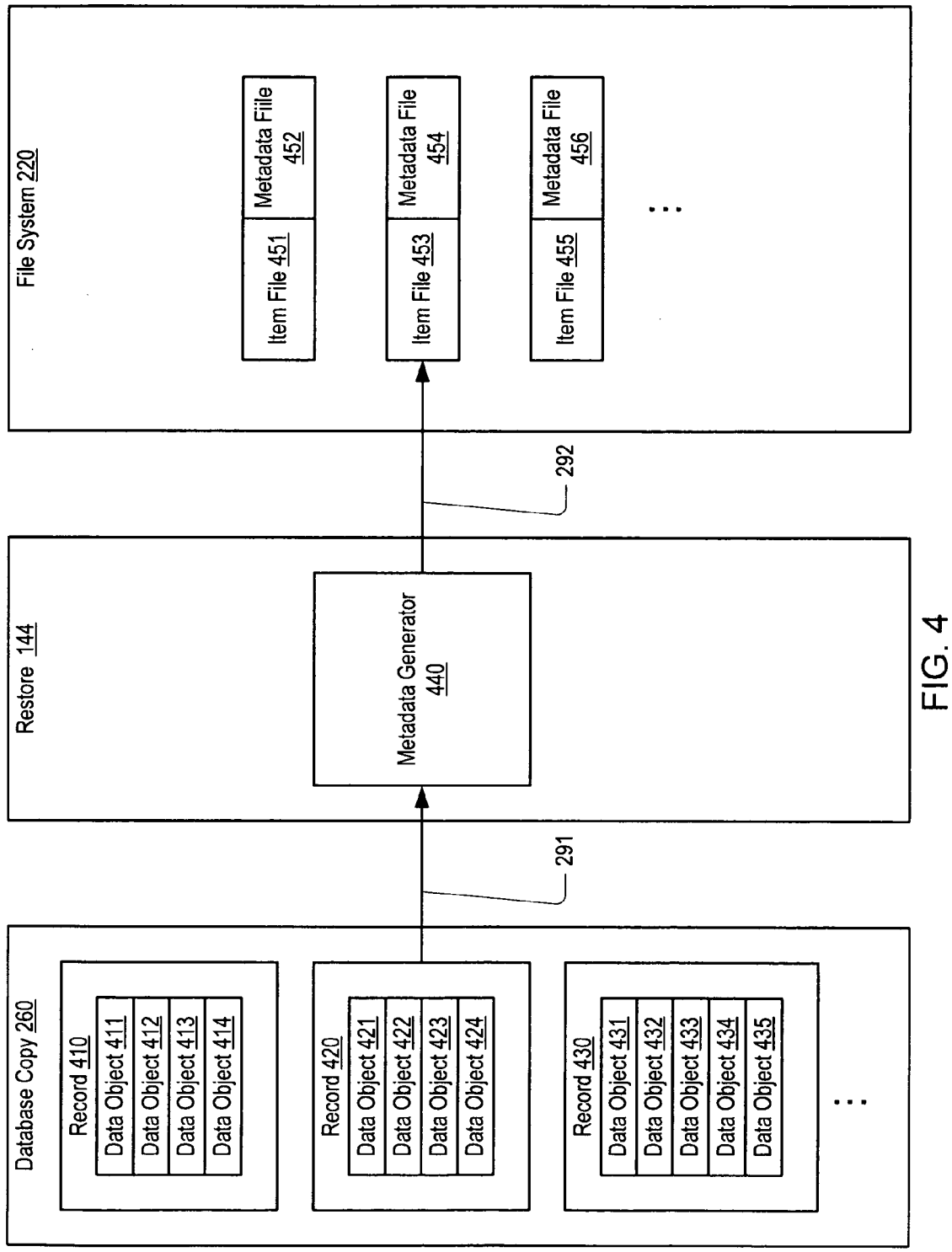
FIG. 4 is a block diagram illustrating the operation of one embodiment of a restore function.

Once a set of items and/or lists has been selected to be restored to the file system, restore function 144 may perform retrieval and formatting operations that enable various applications to access the retrieved lists/items. FIG. 4 is a block diagram illustrating the operation of one embodiment of restore function 144. In the illustrated embodiment, restore function 144 includes a metadata generator 440 that is coupled to and operable to retrieve records from database copy 260 via interface 291. Metadata generator 440 is further coupled to and operable to store files within file system 220 via interface 292.

In the example shown, database copy 260 includes records 410, 420, and 430 that represent any number of stored database records. Each record may include one or more data objects. In the example shown, record 410 includes data objects 411-414, record 420 includes data objects 421-424, and record 430 includes data objects 431-435. For each item that it stores in file system 220, metadata generator 440 may store an item file and a corresponding metadata file. For example, in the illustrated example, file system 220 includes item files 451, 453, and 455 and associated metadata files 452, 454, and 456, respectively.

In one embodiment, metadata files generated by metadata generator 440 may be formatted in Collaborative Application Markup Language (CAML). CAML, as used herein, refers to an XML-based markup language that includes specific groups of tags that may be used by intranet portal applications to both define and display data objects. More particularly, during operation, metadata generator may use interface 291 to retrieve a record that corresponds to a requested item, identifying attributes of the item that are also stored in the record. Metadata generator 440 may extract the item from the record and generate an item file comprising the item stored in a raw or well-known file format that may be commonly understood by various software programs such as a .txt text file, a .jpg or .gif image file, etc. In addition, metadata generator 440 may generate an associated CAML element with appropriate tags for each item attribute that is found. Metadata generator 440 may store the tagged attributes in a metadata file that is associated with the item file. Metadata generator 440 may then use interface 292 to store the item or list and associated metadata as associated files in file system 220.

Once an item file and an associated metadata file have been stored in file system 220, they may be accessed by intranet portal application 120, application 130, or another application as follows. Since the attributes that are described in an item's associated metadata file originated from an intranet portal application, they describe the intranet portal environment sufficiently to enable restoration of the item to a similar environment in an intranet portal. Thus, intranet portal 120 may retrieve items from file system 220 via interface 293 including accessing an item's associated metadata file to retrieve sufficient environmental information to restore the item to the intranet portal environment. Alternatively, another application such as application 130 may ignore an item's associated metadata file and access the file item directly via interface 294 in a raw or well-known file format. Accordingly, by providing an item file for each item, various types of items may be redirected from there original environment in a copy of a database used by an intranet portal to any other application environment that can access files in a file system.

Figure 5:
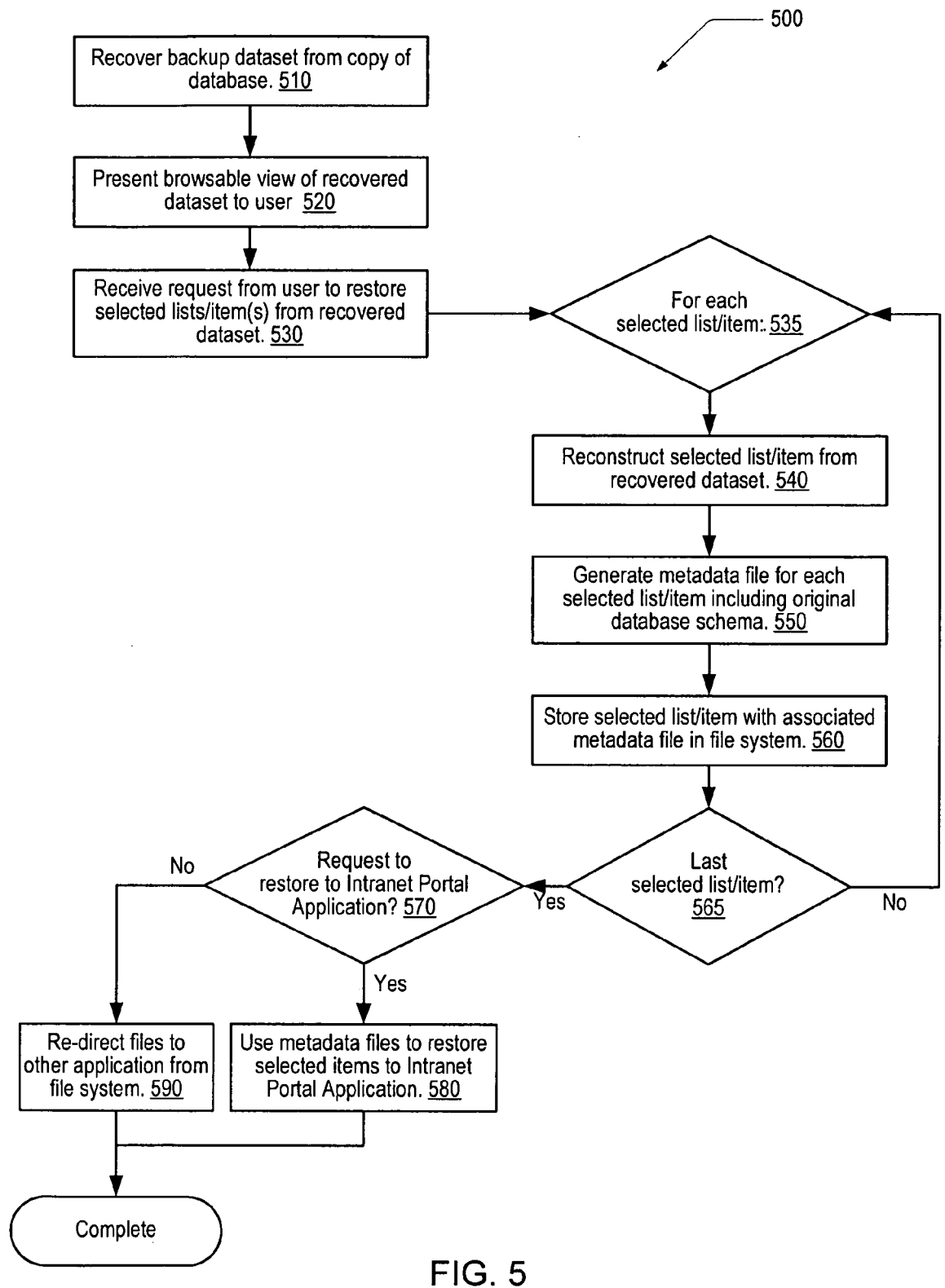
FIG. 5 illustrates one embodiment of a process that may be used to restore or redirect items from a backup copy of a database used by an intranet portal application.

FIG. 5 illustrates one embodiment of a process 500 that may be used to restore or redirect items from a backup copy of a database used by an intranet portal application. Process 500 may begin with recovery of a backup dataset from a copy of a database (block 510). For example, a dataset that has been stored as a backup copy of a database used by an intranet portal application to store lists and items may be recovered to a temporary location. A user may then be presented with a browsable view of the recovered dataset (block 520), such as the graphical user interface illustrated in FIG. 3. A user may browse the view of the recovered dataset and select items to be restored. A request to restore the user's selected items may be received (block 530). In response to the request, for each selected item (decision block 535) a raw file form of the item may be reconstructed from the backup dataset using a well-know file format (block 540). In one embodiment, the well-know format files may be referred to as item files. In addition, a metadata file may be generated that includes a tagged entry for each attribute that is stored in the recovered dataset and associated with the selected item (block 550). The metadata file describes the items in the database schema from which the backup copy was taken; for example, the schema may describe the item in the environment of the intranet portal application. Both the item file and the associated metadata file may then be stored in the file system (block 560). Once item files and metadata files have been created for each selected item (decision block 565), if the request is a request to restore the item or items to the environment of the intranet portal application (decision block 570), the information in the metadata file associated with each item file may be used to restore the item to the intranet portal application environment (block 580), completing process 500. It is noted that the metadata file information may use a standard markup language format that is well-know to intranet portal applications, such as CAML, so that the metadata file information be alternatively be used to enter the item as a new item in a different intranet portal application environment or the environment of a different instance of the same intranet portal application. In addition, if the request is not a request to restore the item or items to the environment of the intranet portal application (decision block 570), the item may be re-directed for use by another application that has access to the file system and therefore to item files in raw or well-known file format (block 590), completing process 500.

Figure 6:
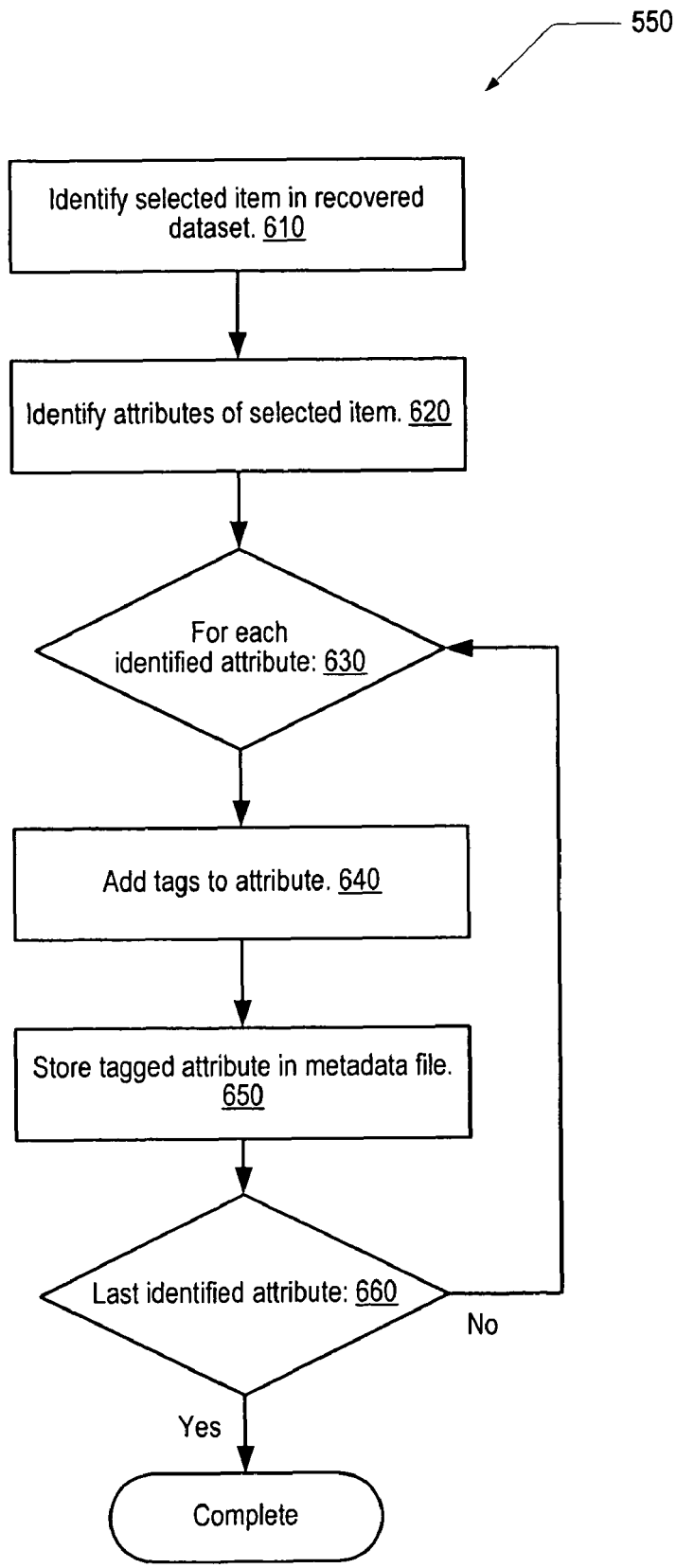
FIG. 6 illustrates a more detailed embodiment of a sub-process that may be used to generate a metadata file for an item stored in a backup copy of a database used by an intranet portal application.

FIG. 6 illustrates a more detailed embodiment of a sub-process 550 of process 500 that may be used to generate a metadata file for an item stored in a backup copy of a database used by an intranet portal application. Sub-process 550 may begin with identification of a selected item in a recovered dataset (block 610), such as through the GUI illustrated in FIG. 3. Once an item has been identified, its schema in the recovered dataset may be examined to identify associated attributes of the item (block 620). For each attribute (decision block 630), a tag may be added to the attribute (block 640) and the tagged attribute stored in a metadata file associated with the item (block 650). Once all the identified item attributes have been tagged and added to the metadata file (decision block 660), sub-process 550 is complete.

It is noted that the foregoing flow charts are for purposes of discussion only. In alternative embodiments, the elements depicted in the flow charts may occur in a different order, or in some cases concurrently. Additionally, some of the flow chart elements may not be present in various embodiments, or may be combined with other elements. All such alternatives are contemplated.

It is further noted that the above-described embodiments may comprise software. In such an embodiment, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for restoring data from an archived copy of a database file, the method comprising:
   receiving a request to restore an item from the archived copy of the database file, the database file being a single monolithic database file, wherein the item comprises a file and associated context information describing the file in a first intranet portal application environment;
   retrieving a schema from the archived copy of the database file, wherein the schema represents a data structure of the database file that includes the item and allows access or restoration of selected items of the archived copy of the database file without use of a database;
   generating an item file and associated metadata file from the retrieved schema, wherein the item file comprises a copy of the file and is independent of the context information, and wherein the metadata file is based on the context information;
   storing the item file and the associated metadata file in a file system; and
   restoring the item to a second intranet portal application via the file system.

2. The method of claim 1, wherein the database file is a single monolithic archived copy, and wherein the first and second intranet portal applications are a same intranet portal application.

3. The method of claim 1, further comprising redirecting the file to a third application directly through the file system without accessing the context information, wherein the third application is different from the first and the second intranet portal applications.

4. The method of claim 1, wherein the context information comprises one or more file attributes and wherein for each of the one or more file attributes, the metadata file includes a corresponding tagged element.

5. The method of claim 4, wherein generating the associated metadata file from the retrieved schema comprises generating Collaborative Application Markup Language, and wherein elements in the metadata file are tagged with tags conforming to the Collaborative Application Markup Language.

6. The method of claim 1, further comprising:
   receiving a request to restore a list comprising two or more items from the archived copy of the database file, wherein each item in the list comprises a file of a same file type and associated context information describing the file in a first intranet portal application environment;

retrieving a list schema from the archived copy of the database file, wherein the list schema includes the two or more items;

for each item in the list:
generating an item file and associated metadata file from the retrieved list schema, wherein the item file comprises a copy of the file and is independent of the context information, and wherein the metadata file is based on the context information; and storing the item file and the associated metadata file in a file system; and restoring the list to a second intranet portal application via the file system.

7. The method of claim 1, wherein the schema comprises information describing a plurality of tables in a row and column arrangement and indexes within the database file, wherein each table comprises one or more associated records within the database file, and wherein one or more records include an index that points to another record in another table.

8. A computer system comprising
a processor; and
a memory storing program instructions for restoring data from an archived copy of a database file, the database file being a single monolithic database file, including program instructions executable by the processor to:
receive a request to restore an item from the archived copy of the database file, wherein the item comprises a file and associated context information describing the file in a first intranet portal application environment;
retrieve a schema from the archived copy of the database file, wherein the schema represents a data structure of the database file that includes the item and allows access or restoration of selected items of the archived copy of the database file without use of a database;
generate an item file and associated metadata file from the retrieved schema, wherein the item file comprises a copy of the file and is independent of the context information, and wherein the metadata file is based on the context information;
store the item file and the associated metadata file in a file system;
and
restore the item to a second intranet portal application via the file system.

9. The computer system of claim 8, wherein the database file is a single monolithic archived copy, and wherein the first and second intranet portal applications are a same intranet portal application.

10. The computer system of claim 8, wherein the program instructions are further executable by the processor to redirect the file to a third application directly through the file system without accessing the context information, wherein the third application is different from the first and the second intranet portal applications.

11. The computer system of claim 8, wherein the context information comprises one or more file attributes and wherein for each of the one or more file attributes, the metadata file includes a corresponding tagged element.

12. The computer system of claim 11, wherein generating the associated metadata file from the retrieved schema comprises generating Collaborative Application Markup Language, and wherein elements in the metadata file are tagged with tags conforming to the Collaborative Application Markup Language (CAML).

13. The computer system of claim 8, wherein the program instructions are further executable by the processor to:
receive a request to restore a list comprising two or more items from the archived copy of the database file, wherein each item in the list comprises a file of a same file type and associated context information describing the file in a firsts intranet portal application environment;
retrieve a list schema from the archived copy of the database file, wherein the list schema includes the two or more items;
for each item in the list:
generate an item file and associated metadata file from the retrieved list schema, wherein the item file comprises a copy of the file and is independent of the context information, and wherein the metadata file is based on the context information;
and
store the item file and the associated metadata file in a file system;
and
restore the list to a second intranet portal application via the file system.

14. The computer system of claim 8, wherein the item comprises an electronic document.

15. A non-transitory computer-readable storage medium storing program instructions for restoring data from an archived copy of a database file, the storage medium including program instructions executable by a processor to:
receive a request to restore an item from the archived copy of the database file, the database file being a single monolithic database file, wherein the item comprises a file and associated context information describing the file in a first intranet portal application environment;
retrieve a schema from the archived copy of the database file, wherein the schema represents a data structure of the database file that includes the item and allows access or restoration of selected items of the archived copy of the database file without use of a database;
generate an item file and associated metadata file from the retrieved schema, wherein the item file comprises a copy of the file and is independent of the context information, and wherein the metadata file is based on the context information;
store the item file and the associated metadata file in a file system;
and
restore the item to a second intranet portal application via the file system.

16. The non-transitory computer-readable storage medium of claim 15, wherein the database file is a single monolithic archived copy, and wherein the first and second intranet portal applications are a same intranet portal application.

17. The non-transitory computer-readable storage medium of claim 15, wherein the program instructions are further executable by the processor to redirect the file to a third application directly through the file system without accessing the context information, wherein the third application is different from the first and the second intranet portal applications.

18. The non-transitory computer-readable storage medium of claim 15, wherein the context information comprises one or more file attributes and wherein for each of the one or more file attributes, the metadata file includes a corresponding tagged element.

19. The non-transitory computer-readable storage medium of claim 18, wherein generating the associated metadata file from the retrieved schema comprises generating Collaborative Application Markup Language, and wherein elements in the metadata file are tagged with tags conforming to the Collaborative Application Markup Language (CAML).

20. The non-transitory computer-readable storage medium of claim 15, wherein the program instructions are further executable by the processor to:

receive a request to restore a list comprising two or more items from the archived copy of the database file, wherein each item in the list comprises a file of a same file type and associated context information describing the file in a firsts intranet portal application environment;

retrieve a list schema from the archived copy of the database file, wherein the list schema includes the two or more items;

for each item in the list:

generate an item file and associated metadata file from the retrieved list schema, wherein the item file comprises a copy of the file and is independent of the context information, and wherein the metadata file is based on the context information;

and store the item file and the associated metadata file in a file system;

and restore the list to a second intranet portal application via the file system.

\* \* \* \* \*